US008605188B2

(12) United States Patent
Ishihara et al.

(10) Patent No.: US 8,605,188 B2
(45) Date of Patent: Dec. 10, 2013

(54) CAMERA HAVING A REAR-SURFACE DISPLAY SECTION AND AN IN-VIEWFINDER DISPLAY SECTION

(75) Inventors: Haruyuki Ishihara, Hino (JP); Koichi Shintani, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 143 days.

(21) Appl. No.: 13/018,070

(22) Filed: Jan. 31, 2011

(65) Prior Publication Data

US 2011/0267526 A1 Nov. 3, 2011

(30) Foreign Application Priority Data

Feb. 2, 2010 (JP) ................................. 2010-021315

(51) Int. Cl.
*H04N 5/222* (2006.01)
(52) U.S. Cl.
USPC ............. 348/333.01; 348/333.02; 348/333.09
(58) Field of Classification Search
USPC ........ 348/341, 346, 333.01–333.13; 396/238, 396/287, 374; 345/173
See application file for complete search history.

(56) References Cited

U.S. PATENT DOCUMENTS

| 5,267,044 | A | | 11/1993 | Nozaki et al. | |
|---|---|---|---|---|---|
| 5,649,244 | A | * | 7/1997 | Sato et al. | 396/287 |
| 5,895,133 | A | * | 4/1999 | Hirai | 396/238 |
| 6,546,207 | B2 | * | 4/2003 | Wakui | 396/298 |
| 7,583,892 | B2 | * | 9/2009 | Okumura | 396/282 |
| 8,184,198 | B2 | * | 5/2012 | Katayama et al. | 348/346 |
| 2005/0140815 | A1 | * | 6/2005 | Nakano et al. | 348/345 |
| 2008/0018774 | A1 | * | 1/2008 | Nakajima et al. | 348/333.08 |
| 2008/0145043 | A1 | * | 6/2008 | Katayama et al. | 396/125 |
| 2008/0267607 | A1 | * | 10/2008 | Mori | 396/374 |
| 2010/0066888 | A1 | * | 3/2010 | Nakai | 348/333.01 |
| 2010/0066890 | A1 | * | 3/2010 | Ueda et al. | 348/333.02 |
| 2010/0141592 | A1 | * | 6/2010 | Andrievsky et al. | 345/173 |
| 2010/0208107 | A1 | * | 8/2010 | Nonaka et al. | 348/240.99 |
| 2011/0019058 | A1 | * | 1/2011 | Sakai et al. | 348/333.01 |

FOREIGN PATENT DOCUMENTS

| JP | 2002-281373 | 9/2002 |
|---|---|---|
| JP | 2003-177294 | 6/2003 |
| JP | 2004-069783 | 3/2004 |
| JP | 2008-258827 | 10/2008 |
| JP | 2010-154426 | 7/2010 |

OTHER PUBLICATIONS

Office Action for Japanese Patent Application No. 2010-021315, dated Aug. 8, 2013 (3 pages).

* cited by examiner

*Primary Examiner* — Roberto Velez
*Assistant Examiner* — Quan Pham
(74) *Attorney, Agent, or Firm* — Straub & Pokotylo; John C. Pokotylo

(57) ABSTRACT

A camera according to the present invention comprises an operation member provided on an outer periphery of a photographing lens of the camera, a mode determination section for determining an adjustment mode in accordance with a first operation of the operation member, a numerical adjustment section capable of numerical adjustment of shooting parameters in accordance with the determined mode, in accordance with a second operation of the operation member, and a switching section for switching the first operation and the second operation.

14 Claims, 9 Drawing Sheets

CAMERA HAVING A REAR-SURFACE DISPLAY SECTION AND AN IN-VIEWFINDER DISPLAY SECTION

Benefit is claimed, under 35 U.S.C. §119, to the filing date of prior Japanese Patent Application No. 2010-021315 filed on Feb. 2 2010. This application is expressly incorporated herein by reference. The scope of the present invention is not limited to any requirements of the specific embodiments described in the application.

BACKGROUND OF THE INVENTION

1. Field of the Invention

The present invention relates to a camera, and in detail relates to improvement of display and operation when carrying out mode settings and adjustments etc. for a digital camera or video camera or the like.

2. Description of the Related Art

Recent cameras are able to electronically acquire images using an image sensor. As a method of displaying a subject image, therefore, besides optical methods that use an optical lens, display using electronic methods is possible, and a variety of display methods are available. Since a user will perform shooting while looking at a subject using this display, the relationship between the operation method and the display method is an important specification for mobile phones having an imaging function such as a camera.

It is also common practice to provide an operation member on the outer periphery of a photographing lens casing for focus and focal length (zoom) adjustment, and to perform shooting by operating these members. These types of operation member can also improve stability at the time of holding the camera, and it can be considered that they will be accepted by a lot of users in the future. Focusing and zoom operations etc. are basic camera operations, and it is possible to design so that it is easy for the photographer to point at a subject whole making shaking unlikely by providing the previously described operation members at a position on the lens barrel that is held by the photographer when deploying the camera. For example, Japanese patent laid-open No. Hei. 4-073628 (laid-open Mar. 9, 1992) discloses a camera that enables focus even for a subject in a macro region by driving a zoom ring using drive means, when a piston ring is driven by drive means in accordance with detection results of an automatic focus detection unit and the end of the piston ring has been detected.

SUMMARY OF THE INVENTION

The present invention has as its object to provide a camera that enables rapid setting of modes and parameters without erroneous operation and with a simple structure.

A camera according to the present invention comprises an operation member provided on an outer periphery of a photographing lens of the camera, a mode determination section for determining an adjustment mode in accordance with a first operation of the operation members, a numerical adjustment section capable of numerical adjustment of shooting parameters in accordance with the determined mode, in accordance with a second operation of the operation members, and a switching section for switching the first operation and the second operation.

Also, a camera according to the present invention comprises a display section provided outside a body and capable of displaying an adjustment mode on an in-viewfinder display section arranged inside the body and capable of displaying shooting parameters, a ring-shaped operation section arranged capable of rotation at the outer periphery of a lens barrel, and a control section for carrying out selection of an adjustment mode in accordance with a rotation operation of the ring-shaped operation section when the adjustment mode is displayed on the display section, and carrying out adjustment of shooting parameters in accordance with a rotation operation of the ring-shaped operation section when the shooting parameters are displayed on the in-viewfinder display section.

DETAILED DESCRIPTION OF THE PREFERRED EMBODIMENTS

Figure 1:
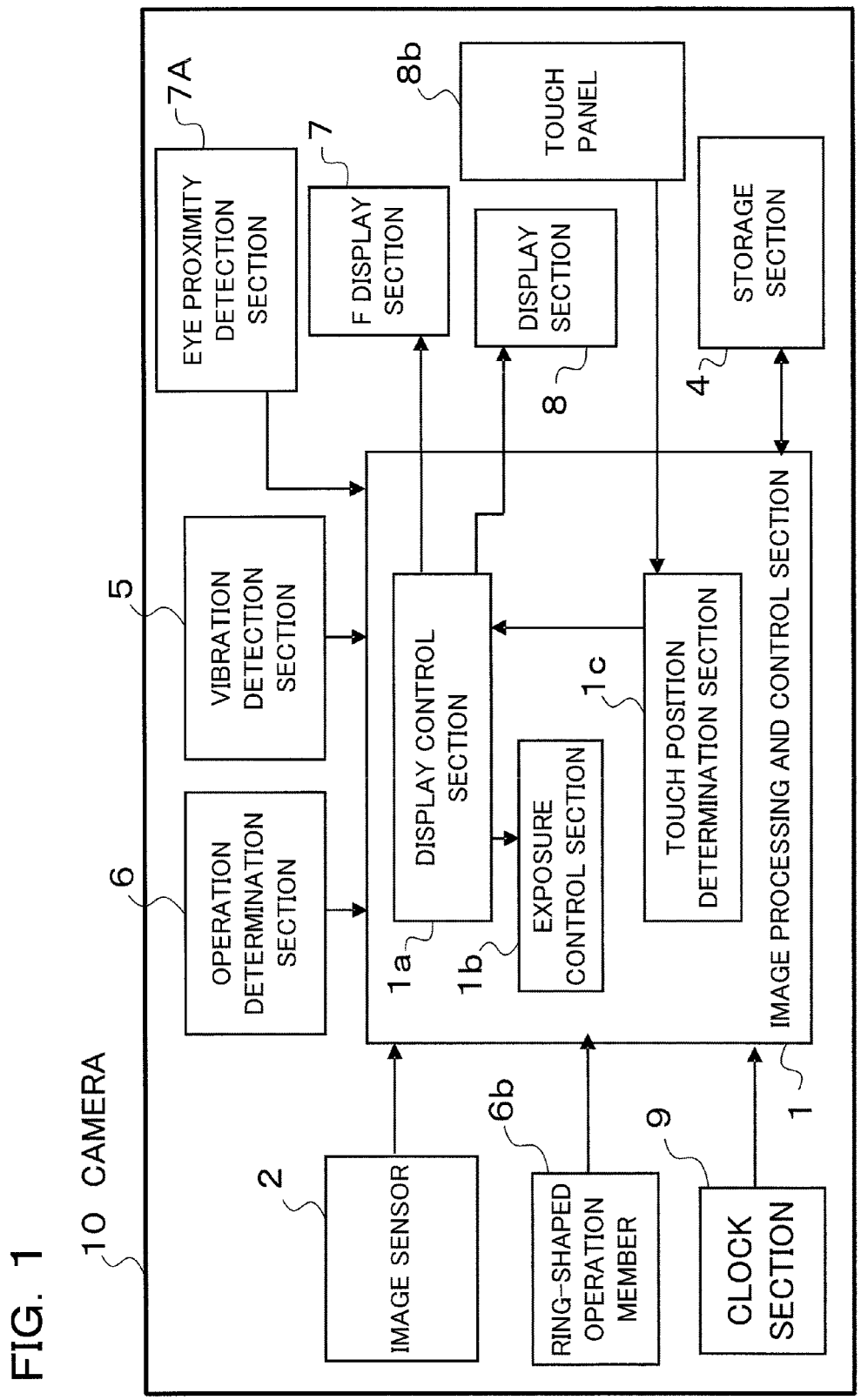
FIG. 1 is a block diagram mainly showing the electrical structure of a camera of a first embodiment of the present invention.

Preferred embodiments using a camera to which the present invention has been applied will be described in the following in accordance with the drawings. A digital camera of a preferred embodiment of the present invention is a digital camera having an imaging section, with a subject image being converted to image data by this imaging section, and the subject image being subjected to live view display on a display section arranged on a rear surface of a body based on this converted image data, and also subjected to live view display in an electronic viewfinder (hereinafter referred to as an EVF) capable of being viewed if an eyepiece is looked through. A photographer determines composition and photo opportunity by looking at the live view display. At the time of a release operation image data is stored in a storage medium. Also, image data that has been stored in the storage medium can be played back and displayed on the display section if playback mode is selected.

The structure of a camera 10 relating to a first embodiment of the present invention will be described using the block diagram shown in FIG. 1. The camera 10 comprises an image processing and control section 1, an imaging section 2, a storage section 4, a vibration detection section 5, an operation determination section 6, a ring-shaped operation section 6b, a viewfinder display section (hereafter referred to as "F display section) 7, an eye proximity detection section 7A, a display section 8, a touch panel 8b and a timer section 9.

The imaging section 2 includes a photographing lens 2b (refer to FIG. 2), an exposure control section such as a shutter, an image sensor 2c (refer to FIG. 2) and driving and reading circuits for the image sensor 2c etc., and converts a subject image formed by the photographing lens 2b to image data, and outputs this data. In this specification, image data is not limited to image signals that have been output from the image sensor 2c, and it is also possible to use image data that has been processed by the image processing and control section 1, and image data stored in the storage section 4 etc.

The ring-shaped operation section 6b (refer to FIG. 3 and FIG. 4) is provided around a lens housed in the photographing lens 2b. This ring-shaped operation section 6b is free to rotate around the lens barrel, and rotation direction and rotation amount of the ring-shaped operation section 6b can be detected by a detection member such as an encoder, not shown. The detected rotation direction and direction amount are output to the image processing and control section 1.

The image processing and control section 1 is made up of a CPU (Central Processing Unit) and peripheral hardware circuits of the CPU, and controls all processing sequences of the camera 10 in accordance with a program stored in a storage section, not shown. The image processing and control section 1 includes a display control section 1a, an exposure control section 1b and a touch position determination section 1c.

The display control section 1a performs live view display of a subject image on the viewfinder display section 7 and the display section 8, and also performs display control for shooting parameter adjustment. Specifically, images for adjustment mode setting representing types of shooting parameter such as, for example, exposure correction value, aperture value, shutter speed, focus, etc. are displayed overlaid on a subject image on the display section 8 arranged on the rear surface of the camera 10, and the display control section 1a carries out this display control. The display control section 1a displays shooting parameters such as exposure compensation and aperture cyclically on the display section 8 as shown in FIG. 3B which will be described later.

Also, images for setting numerical values for shooting parameters such as exposure compensation value etc. are displayed overlaid on the subject image on the viewfinder display section 7 that is arranged inside the camera 10 and viewed through the eyepiece 7c (refer to FIG. 3 and FIG. 4), and the display control section 1a carries out this display control.

The exposure control section 1b determines a user's operation using the operation determination section 6, and carries out control of shooting based on the result of this determination. With this embodiment, as well as the operation determination section 6, it is possible to set various modes and parameters etc. using the touch panel 8b and the ring-shaped operation section 6b, and the exposure control section 1b performs shooting that reflects these set various modes and parameters.

The touch position determination section 1c receives input of a detection signal from the touch panel 8b, and determines a touch position of the touch panel 8b based on this detection signal. Also, the image processing and control section 1 performs various image processing such as, for example, white balance, color correction, image generation for live view display, movie image generation, image compression and image expansion etc. for image data input from the imaging section 2.

The storage section 4 is constituted by a storage medium that can be fitted into and taken out of the camera body, or a built-in storage medium. Image data for still pictures and movies that has been input from the imaging section 2, and subjected to image processing by the image processing and control section 1, and attached data, is stored in the storage section 4. The clock section 9 has a clock function, and outputs time and date information. At the time of shooting, this time and date information is stored in the storage section 4 together with image data.

The vibration detection section 5 is comprised of one or a plurality of acceleration sensors arranged inside the camera 10, and drivers for the acceleration sensors, and detects orientation of the camera 10 and vibration applied to the camera 10. Detection results from the acceleration sensor 5 are output to the image processing and control section 1, and used in a vibration prevention operation. The vibration detection section 5 is also capable of detecting acceleration generated intermittently when the user taps the camera 10. Based on this tap operation the camera 10 is input with instructions from the photographer.

The operation determination section 6 has various operation members such as a release button, power supply button playback button and menu button arranged on the outside of the camera 10, and determines operational states of the operation members and outputs the results of these determination to the image processing and control section 1.

The display section 8 is connected to the image processing and control section 1, has a monitor such as a liquid crystal monitor or an organic EL monitor that is arranged on a rear surface of the body, and performs live view display or quick-view display at the time of shooting, and display of stored images that are stored in the storage section 4 and control images such as menu images. The touch panel 8b is arranged on a front surface of a liquid crystal monitor or organic EL monitor, or is integrated inside such a monitor, and transmits a detection signal that corresponds to a position where the user has touched the display section 8 to the image processing and control section 1.

Figure 3A:
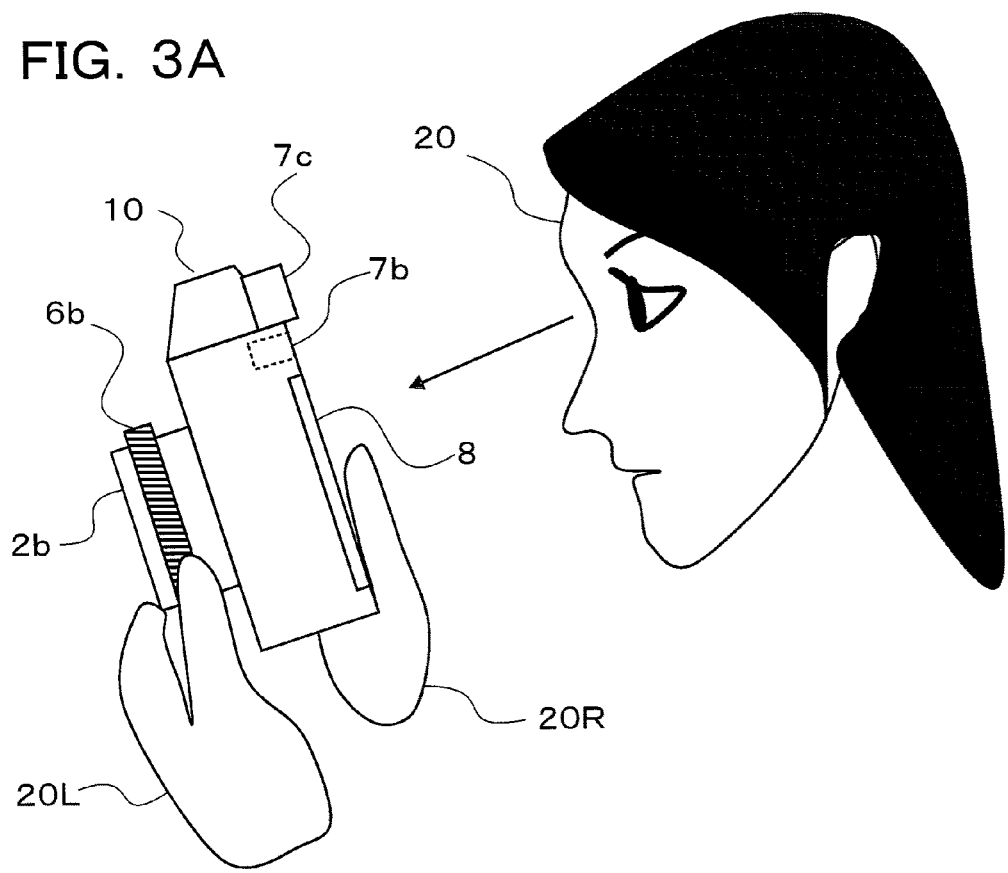
FIG. 3A and FIG. 3B are drawings for describing adjustment mode setting in the camera of the first embodiment of the present invention, FIG. 3A showing appearance of setting adjustment mode while monitoring a display section arranged on a rear surface, and FIG. 3B showing adjustment mode display on the display section.
Figure 3B:
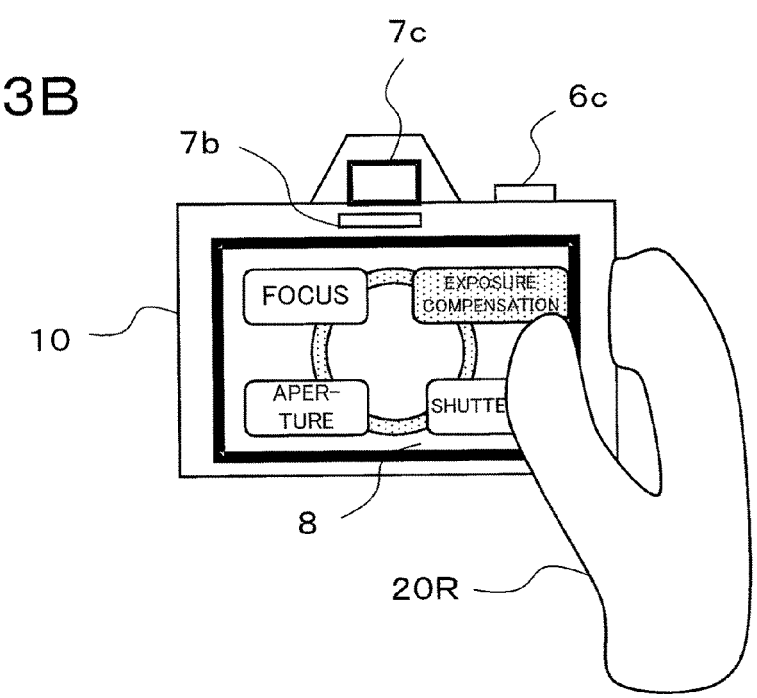
Figure 4A:
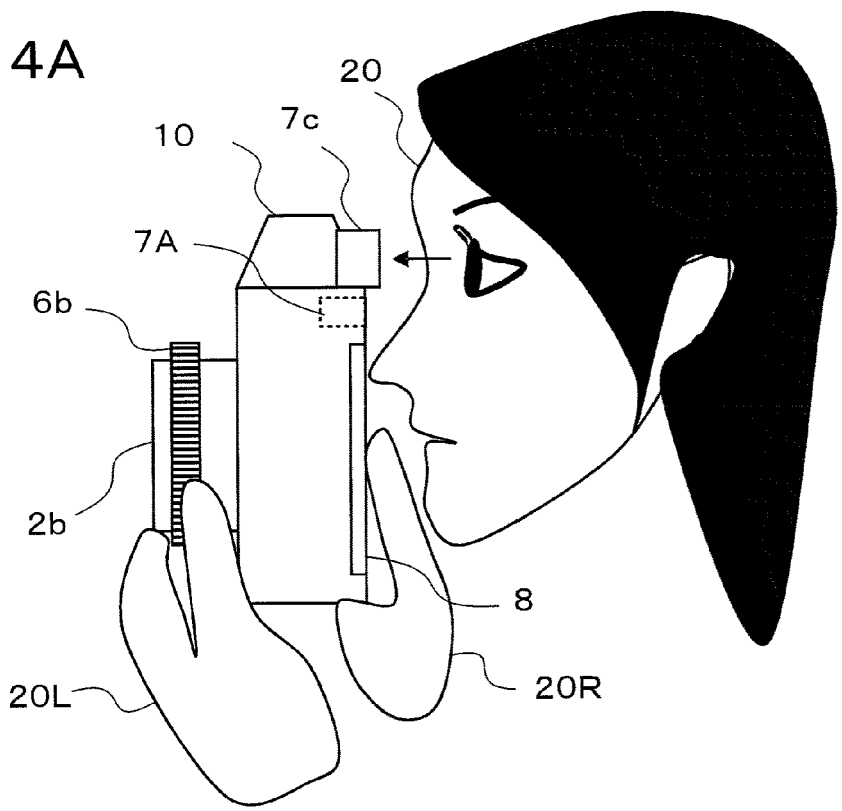
FIG. 4A to FIG. 4C are drawings for describing setting of shooting parameters (exposure compensation values) in the camera of the first embodiment of the present invention, FIG. 4A showing appearance of setting shooting parameters while looking into an eyepiece, and FIG. 4B and FIG. 4C showing shooting parameter display that can be observed through the eyepiece.

The viewfinder display section 7 is a so-called electronic viewfinder (EVF), with which it is possible to observe a small display panel 7a (refer to FIG. (2) arranged inside the body through an eyepiece 7c (refer to FIG. 3A and FIG. 4A). A subject image based on image data output from the imaging section 2 is also displayed on this display panel 7a, and images for shooting parameter setting, such as exposure compensation values, are also displayed. The eye proximity detection section 7A detects whether the eye of the photographer 20 is in contact with or close to the eyepiece 7c of the viewfinder display section 7.

Next the structure of the viewfinder display section 7 and the eye proximity detection section 7A will be described using FIG. 2. The image sensor 2c is arranged on the optical axis of the photographing lens 2b constituting the imaging section 2, the photographing lens 2b forms subject light flux into an image on the image sensor 2c, and the image sensor 2c converts the subject image into image data and outputs the image data to the image processing and control section 1. The display section 8 is connected to the display control section 1a that is inside the image processing and control section 1, and image data that has been subjected to image processing in the image processing and control section 1, and image data for setting adjustment modes etc., is output to the display section 8 where it is displayed.

Also, the image processing and control section 1 is connected to the display panel 7a constituting the in-viewfinder display section 7, and image data from the image sensor 2c and image data for shooting parameter setting etc. is output to the display panel 7a. An ocular lens 7b is arranged close to the eyepiece 7c (refer to FIG. 3A and FIG. 4A), of the camera 10. The photographer 20 can observe an image displayed on the display panel 7a through the ocular lens 7b by bringing their eye into contact with the eyepiece 7c. The in-viewfinder display section 7 is comprised of the display panel 7a, the ocular lens 7b and the eyepiece 7c.

A floodlight element 7d is connected to the image processing and control section 1, and projects light in response to an emission command signal from the image processing and control section 1. The floodlight element 7d is arranged so that the ocular lens 7b is on the optical path of the projected light. Also, a light receiving lens 7e and light receiving element 7f are arranged at positions that make it possible to receive projected light from the floodlight element 7d that has been reflected when the photographer 20 is observing close to the eyepiece 7c. The light receiving element 7f performs photoelectric conversion on the reflected light, and outputs this detection signal to the image processing and control section 1. The eye proximity detection section 7A of this embodiment is comprised of the above described floodlight element 7d, ocular lens 7a, light receiving lens 7e, light receiving element 7f, etc.

Since the eye proximity detection section 7A is constructed in this way, when the photographer 20 is close to the eyepiece 7c, such as when the photographer 20 is looking into the eyepiece 7c, this can be detected. Specifically, if the photographer 20 is looking into the eyepiece 7c in order to observe the display panel 7a of the in-viewfinder display section 7, projected light from the floodlight element 7d is reflected by the cheek etc. of the photographer 20. The light receiving element 7f receives this reflected light, and outputs a detection signal to the image processing and control section 1. The image processing and control section 1 can determine that the photographer 20 is looking in to the eyepiece 7c based on this detection signal.

Next, adjustment mode settings for exposure mode parameter selection and adjustment of numerical values for shooting parameters carried out using the ring-shaped operation section 6b will be described using FIG. 3A to FIG. 4C. FIG. 3A shows appearance of adjustment mode setting for setting any of shooting parameters while the photographer 20 is looking at the display section 8, without looking into the eyepiece 7c. Specifically, if it is detected by the eye proximity detection section 7A that the photographer 20 is not looking into the eyepiece 7c, the display control section 1a displays images for adjustment mode setting in order to carry out shooting parameter selection on the display section 8, as shown in FIG. 3B. In this embodiment exposure compensation, focus, aperture value and shutter speed can be set as adjustment modes.

Adjustment currently being selected is displayed distinctly from other adjustment modes by changing the display format, such as color. In this state, if the photographer 20 rotates the ring-shaped operation section 6b that is arranged around the outside of the photographing lens 2b using their left hand 20L, the adjustment parameter to be selected is sequentially changed. For example, if the ring-shaped operation section 6b is turned clockwise, then as shown in FIG. 3B the shooting parameter is cyclically changed in the order exposure compensation→shutter speed→aperture value→focus, while if the ring-shaped operation section 6b is rotated counterclockwise the shooting parameter is cyclically changed in the order exposure compensation→focus→aperture value→shutter speed. The rotation direction of the ring-shaped operation section 6b and the direction in which the shooting parameter changes are made the same direction.

In this way, in this embodiment it is possible for the photographer 20 to carry out adjustment mode setting in order to select shooting parameters by simply rotating the ring-shaped operation section 6b with their left hand 20L while still keeping hold of the camera 10 in their right hand 20R so that it doesn't shake. Shooting parameters are cyclically displayed on the display section 8 and cyclically changed in accordance with the rotation direction of the ring-shaped operation section 6b which means that it is possible to simply carry out adjustment mode setting. Display of adjustment mode setting being selected can be performed so that it is possible to distinguish from other adjustment modes using a method other than changing color, such as by flashing.

Figure 4B:
Figure 4C:
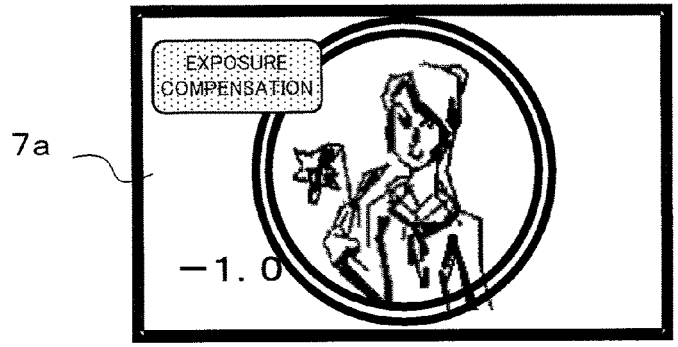

Once adjustment mode setting has been carried out, setting of numerical values for shooting parameters is carried out. FIG. 4A shows appearance of setting numerical values for shooting parameters while the photographer 20 is looking into the eyepiece 7c and looking at the display on the in-viewfinder display section 7b. Specifically, if it is detected by the eye proximity detection section 7A that the photographer 20 is looking into the eyepiece 7c, the display control section 1a displays images in order to carry out numerical value setting of shooting parameters on the display panel 7a of the in-viewfinder display section 7, as shown in FIG. 4B and FIG. 4C. In the examples of FIG. 4B and FIG. 4C, the adjustment mode is a state where exposure compensation setting has been selected.

As images for shooting parameter numerical value setting, adjustment mode being selected is displayed at the upper left (exposure compensation in the examples of FIG. 4B and FIG. 4C), numerical values for shooting parameter are displayed at the lower left (+1.0 and −1.0 in the drawing examples), and a ring for conforming with the use sensation of the ring-shaped operation section 6b is displayed in the center of the screen.

In a state where numerical values for shooting parameters have been displayed, if the photographer 20 rotates the ring-shaped operation section 6b that is arranged around the outside of the photographing lens 2b using their left hand 20L, numerical values of the shooting parameter are sequentially changed. For example, if the ring-shaped operation section 6b is turned clockwise, then with the examples shown in FIGS. 4B and 4C exposure compensation is changed so as to increase, while if the ring-shaped operation section 6b is rotated counterclockwise exposure is changed to decrease.

In the event that aperture value is being selected as the adjustment mode, then aperture value is increased by turning the ring-shaped operation section 6b, while if shutter speed is being set then shutter speed is increased, and if focus is being set subject distance is changed to the long distance side or the close range side. In the case where focus is being set as the adjustment mode, it is the same as conventional manual focus, and in this case it is also possible to display subject distance, but similarly to the related art, it is possible to not display subject distance.

In this way, with the first embodiment of the present invention, it is possible to look at the in-viewfinder display section 7 through the eyepiece 7c, as shown in FIG. 4A, and carry out shooting parameter adjustment while confirming the subject. If a numerical value of a shooting parameter is changed, display of the subject image on the in-viewfinder display section 7 changes in accordance with the numerical value change, which means that it is possible for the photographer 20 to confirm changes to the subject image in accordance with change in the shooting parameter. With display on the display section 8 that is arranged on the rear surface of the camera 10 etc. it is difficult to confirm very small changes in the image due to the influence of external light, but with display on the in-viewfinder display section 7 the external light has no effect and so confirming the outcome resulting from changes to the shooting parameters is easy.

It is also possible to increase or decrease the numerical value of an shooting parameter by turning the ring-shaped operation section 6b clockwise or counter clockwise. Changing from the adjustment mode setting state shown in FIG. 3B to the shooting parameter numerical value setting state shown in FIG. 4B and FIG. 4C is simply the photographer 20 looking into the eyepiece 7c. At this time the way in which the camera 10 is held and the hand in which the ring-shaped operation section 6b is held do not need to be changed in any way. It is therefore possible to carry out parameter setting from adjustment mode setting rapidly and without being affected by hand shake.

Figure 5:
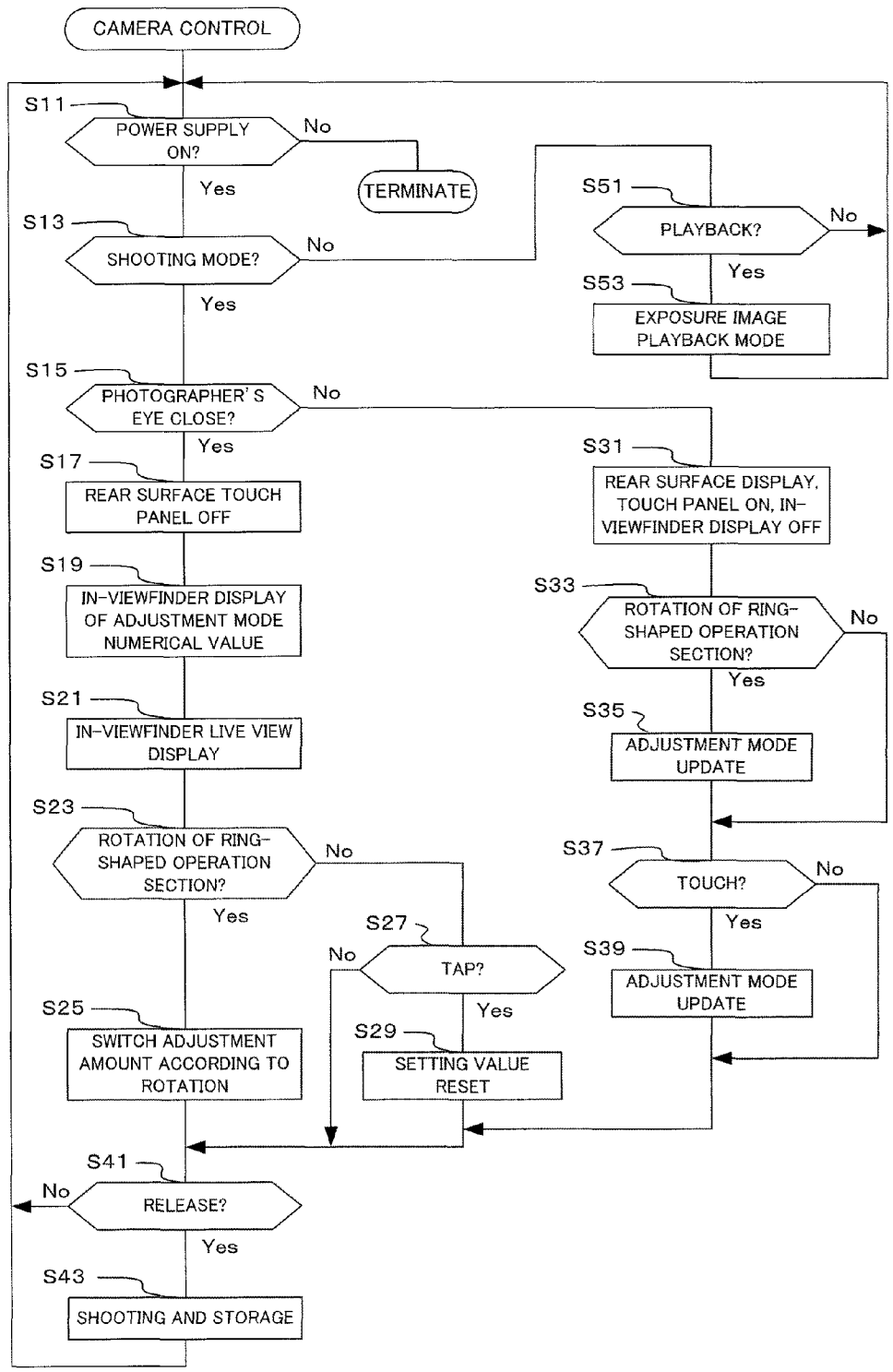
FIG. 5 is a flowchart showing operation for camera control for the camera of the first embodiment of the present invention.

Next, operation of the first embodiment of the present invention will be described using the flowchart shown in FIG. 5. This flowchart is executed by the image processing section and the control section 1, in accordance with programs stored in a storage section (not shown) of the camera 10.

In the camera control flow, it is first determined whether or not a power supply is on (S11). Since it is determined by the operation determination section 6 whether or not a power supply button has been operated, in a power on state where the power button has been operated it is determined that the power supply is on. If the result of this determination is that the power supply is not on, camera control flow is terminated. Even if camera control flow is terminated, it is determined at predetermined time intervals whether the power supply button has been operated, and if the power supply button has been operated processing transfers to the next step S13.

If the result of determination in step S11 is that the power switch is on, it is next determined whether or not the camera is in shooting mode (S13). If the result of this determination is that the camera is in shooting mode, then it is determined whether or not the photographer's eye is close to the camera (S15). Here, it is determined by the ocular detection section 7A whether or not the photographer 20 is looking into the eyepiece 7c, as shown in FIG. 4A.

If the result of determination in step S15 is that the photographer's eye is in the vicinity of the camera, rear surface display is next carried out, together with turning the touch panel 8b on and turning display of the in-viewfinder display section 7 off (S31). Here display of adjustment mode for setting shooting parameters, as shown in FIG. 3B, is performed on the display panel of the display section 8 provided on the rear surface of the camera 10. Also, by putting the touch panel 8b into an operating state it is possible for the photographer 20 to issue commands by contacting or touching the display panel of the display section 8. Also, since the photographer is not looking into the in-viewfinder display section 7, this display is turned off.

It is next determined whether or not the ring-shaped operation section has been rotated (S33). Here, it is determined whether or not the photographer 20 has rotated the ring-shaped operation section 6b in order to select an adjustment mode such as exposure compensation, while looking at the display section 8 arranged on the rear surface of the camera 10. This determination is carried out based on a detection signal from an encoder that generates signals in accordance with rotation of the ring-shaped operation section 6b.

If the result of determination in step S33 is that the ring-shaped operation section 6b has been rotated, adjustment mode change is carried out (S35). Here, the rotation direction of the ring-shaped operation section 6b and the movement direction of the adjustment mode selected on the display section 8 are made to conform with each other, as described in FIG. 3B.

With this embodiment, an exposure mode that has been selected by the rotation operation of the ring-shaped operation section 6b is determined as the adjustment mode. However, this is not limiting, and it is also possible to carry out determination of adjustment mode in a case where the same shooting parameter has been selected by the rotation operation of the ring-shaped operation section 6 after a predetermined time, or if a determination operation has not been carried out by an operation member such as an OK button.

With this embodiment, if the result of determination in step S15 was that the photographer's eye was close to the camera, adjustment mode display was carried out on the display panel of the display section 8 in step S31. However, it is also possible, in step S31, to not carry out the adjustment mode, and carry out adjustment mode display in the event that the ring-shaped operation section 6b has been rotated in step S33.

Once change of adjustment mode has been carried out in step S35, or if the result of determination in step S33 is that the ring-shaped operation section 6 has not been rotated, it is next determined whether or not the touch panel 8b has been touched (S37). Selection of adjustment mode, such as exposure compensation, can also be carried out in this embodiment by directly contacting or touching the display section 8, as well as by rotating the ring-shaped operation section 6b. Specifically, if the photographer 20 has a mode they wish to set during an adjustment mode such as exposure compensation that is being displayed on the display section 8, that mode is directly touched.

If the result of determination in step S37 is that the touch panel 8b has been touched, adjustment mode change is carried out (S37). Here, the touch position determination section 1c determines a touch position, and an adjustment mode is determined and adjustment mode change carried out based on the result of this determination.

If the result of determination in step S15 is that the photographer's eye is close to the camera, the rear surface touch panel is next turned off (S17). Since the photographer 20 is looking into the eyepiece 7c and observing the image displayed on the display panel 7a of the in-viewfinder display section 7, the touch panel 8b arranged on the rear surface of the camera 10 is turned off.

Once the rear surface touch panel 8b has been turned off, numerical values for the selected adjustment mode is next displayed in the viewfinder (S19). Since an adjustment mode such as exposure compensation is being selected in step S35 or S39 described above, numerical values for the selected adjustment mode are displayed on the display panel 7a inside the viewfinder, as shown in FIG. 4B and FIG. 4C.

Next, live view is displayed in the viewfinder (S21). Here, live view display of a subject is carried out on the display panel 7a inside the viewfinder, based on image data output from the imaging section 2.

Once live view display has been carried out inside the viewfinder, it is next determined whether or not the ring-shaped operation section 6b has been rotated, similarly to step S33 (S23). If the result of this determination is that the ring-shaped operation section 6b has been rotated, adjustment amount switching is carried out in accordance with the rotation (S25). Here, as was described using FIG. 4B and FIG. 4C, shooting parameters of the selected adjustment mode are increased or decreased in accordance with rotation direction and rotation amount of the ring-shaped operation section 6b.

Also, in the case where the result of determination in step S23 is that the ring-shaped operation section 6b has not been rotated, it is next determined whether or not a touch operation has been carried out (S27). By operating the ring-shaped operation section 6b it is possible to increase or decrease shooting parameters, in the event that original values are returned to it is necessary to perform the reverse operation, which is disadvantageous from the point of view of swiftness. With this embodiment, therefore, it is made possible to reset to original values by carrying out a tap operation. In this step S27, it is determined whether or not the photographer 20 has carried out a tap operation based on a detection signal from the vibration detection section 5.

If the result of determination in step S27 is that there has been a tap operation, the setting values are reset (S29). Here, the values are reset to original values before the photographer's eye was close to the camera, as described previously.

Once the processing for previously described steps S25, S29 or S39 has been executed, or if the result of determination in step S27 was that there was not a tap operation, or if the result of determination in step S27 was that there was not touch, it is next determined whether or not there has been a release operation (S41). Here, determination of whether or not the release button 6c has been operated is carried out by the operation determination section 6.

If the result of determination in step S41 is that there is no release, step S11 is returned to. On the other hand, if there has been release, shooting and storage are carried out (S43). Here, image signals output from the imaging section 2 are stored in the storage section 4 after having been subjected to image processing. Once image data storage has been carried out, processing returns to step S11.

If the result of determination in step S13 was that it is not shooting mode, it is next determined whether or not it is playback mode (S51). Here, determination of whether or not the playback button has been operated is carried out by the operation determination section 6. If the result of this determination is that it is not playback mode, processing returns to step S11.

On the other hand, if the result of determination in step S51 was playback mode, taken images are next played back (S53). Here, image data of designated images is read out from the storage section 4, and subjected to playback display. Once the playback display has been carried out, processing returns to step S11.

As has been described above, with the first embodiment of the present invention, in the case where the photographer 20 is not observing display on the in-viewfinder display section 7, display for selecting an adjustment mode, such as exposure compensation, is carried out on the display section 8 arranged on the rear surface of the camera 10, as shown in FIG. 3B. The photographer 20 can change the adjustment mode by operating the ring-shaped operation section 6b while looking at this display.

Also, in the case where the photographer 20 is observing the display on the in-viewfinder display section 7, it is possible to adjust numerical values of exposure parameters corresponding to the selected adjustment mode by rotating the ring-shaped operation section 6b. In this way, with this embodiment it is possible to rapidly carry out setting of adjustment mode in accordance with an observation state of the display section of the camera and rotation of the ring-shaped operation section, and it is possible to carry out adjustment of shooting parameters in the set adjustment mode.

In the first embodiment of the present invention, the ring-shaped operation section 6b is arranged so as to rotate around the outside of the lens barrel rotates, and setting of adjustment mode and numerical values for shooting parameters are adjusted in accordance with this rotation operation. However this is not limiting and it is also possible to adjust only one of setting mode or numerical values for shooting parameters in response to rotation of the ring-shaped operation section 6b. In this case, the other adjustment can be adjusted using different operation members provided on the lens barrel.

Figure 6A:
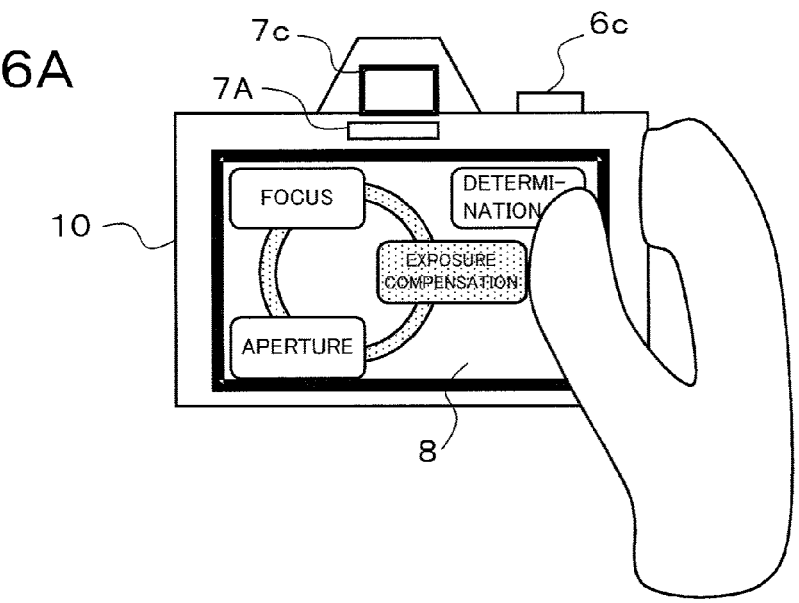
FIG. 6A to FIG. 6C are drawings showing rear surface display of a camera of a second embodiment of the present invention, FIG. 6A showing rear surface display when the photographer has moved their eye away from the eyepiece, FIG. 6B showing rear surface display when the photographer has their eye against the eyepiece, and FIG. 6C showing a modified example of rear surface display when the photographer has their eye against the eyepiece.
Figure 6B:
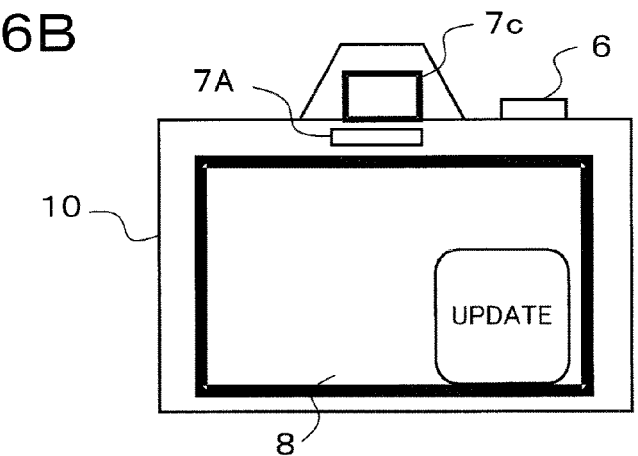
Figure 6C:
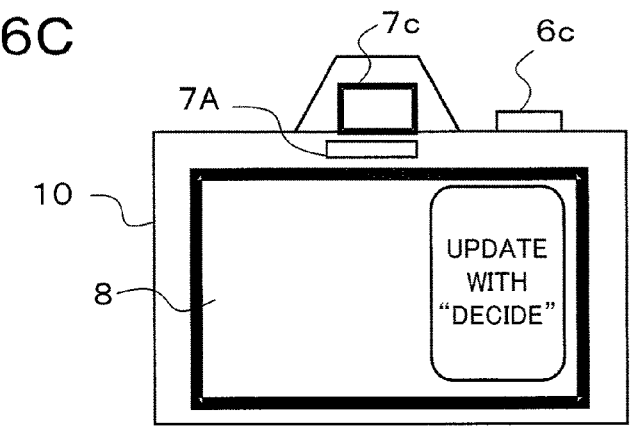
Figure 7:
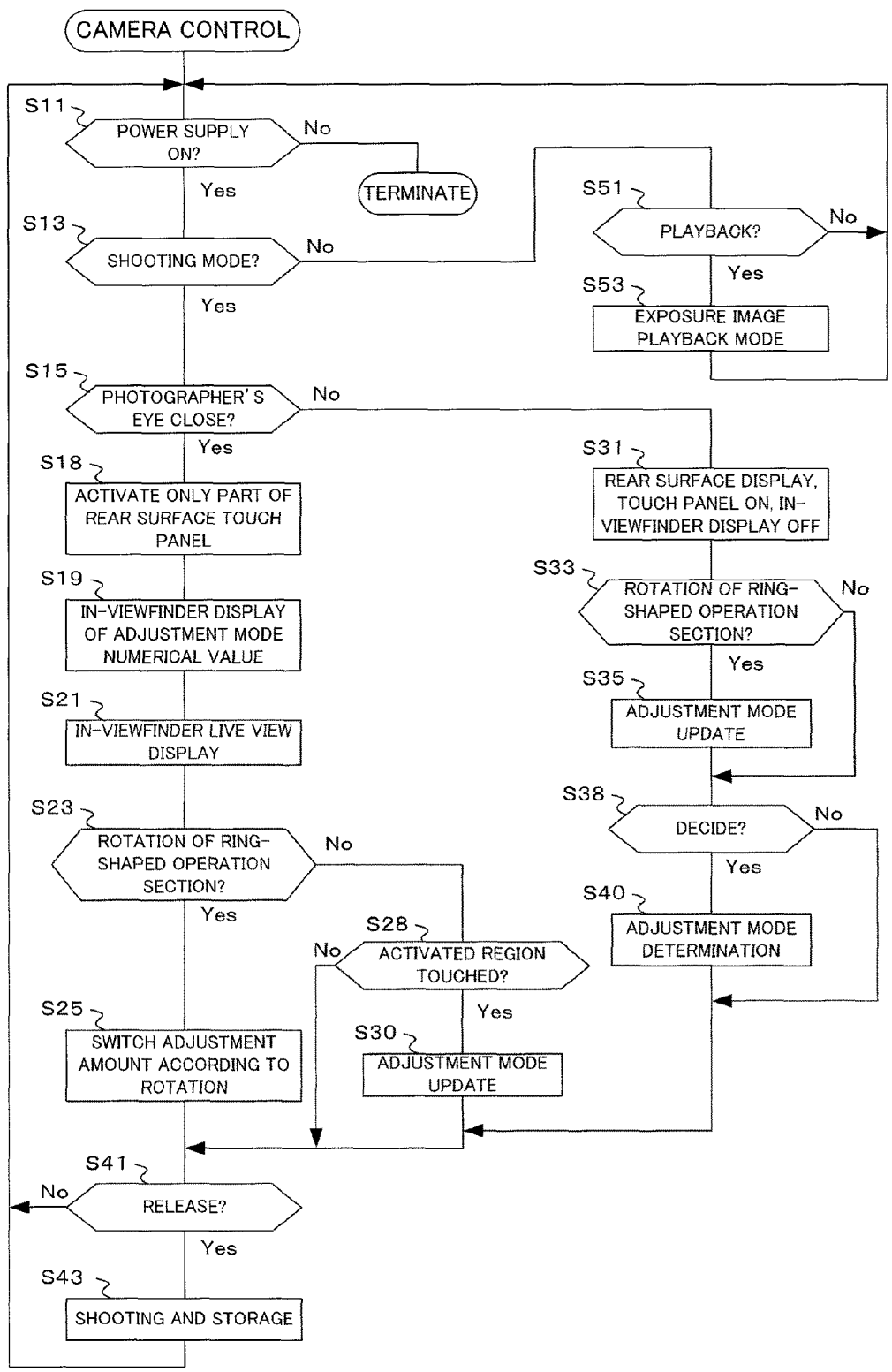
FIG. 7 is a flowchart showing operation for camera control for the camera of the second embodiment of the present invention.

Next, a second embodiment of the present invention will be described using FIG. 6 and FIG. 7. In the first embodiment, adjustment mode was entered if the eye was taken away from the eyepiece 7c, and adjustment of shooting parameters in a selected adjustment mode was carried out if the eye was brought close to the eyepiece 7c. Therefore, in the case where shooting is carried out while looking into the eyepiece 7c or moving away from the eyepiece 7c there is a danger of erroneous operation. With this embodiment therefore, it is made possible to carry out adjustment mode selection by touching an icon (decide) displayed on the display surface of the display section 8 arranged on the rear surface of the camera 10 in a state where the eye is removed from the eyepiece 7c.

Figure 2:
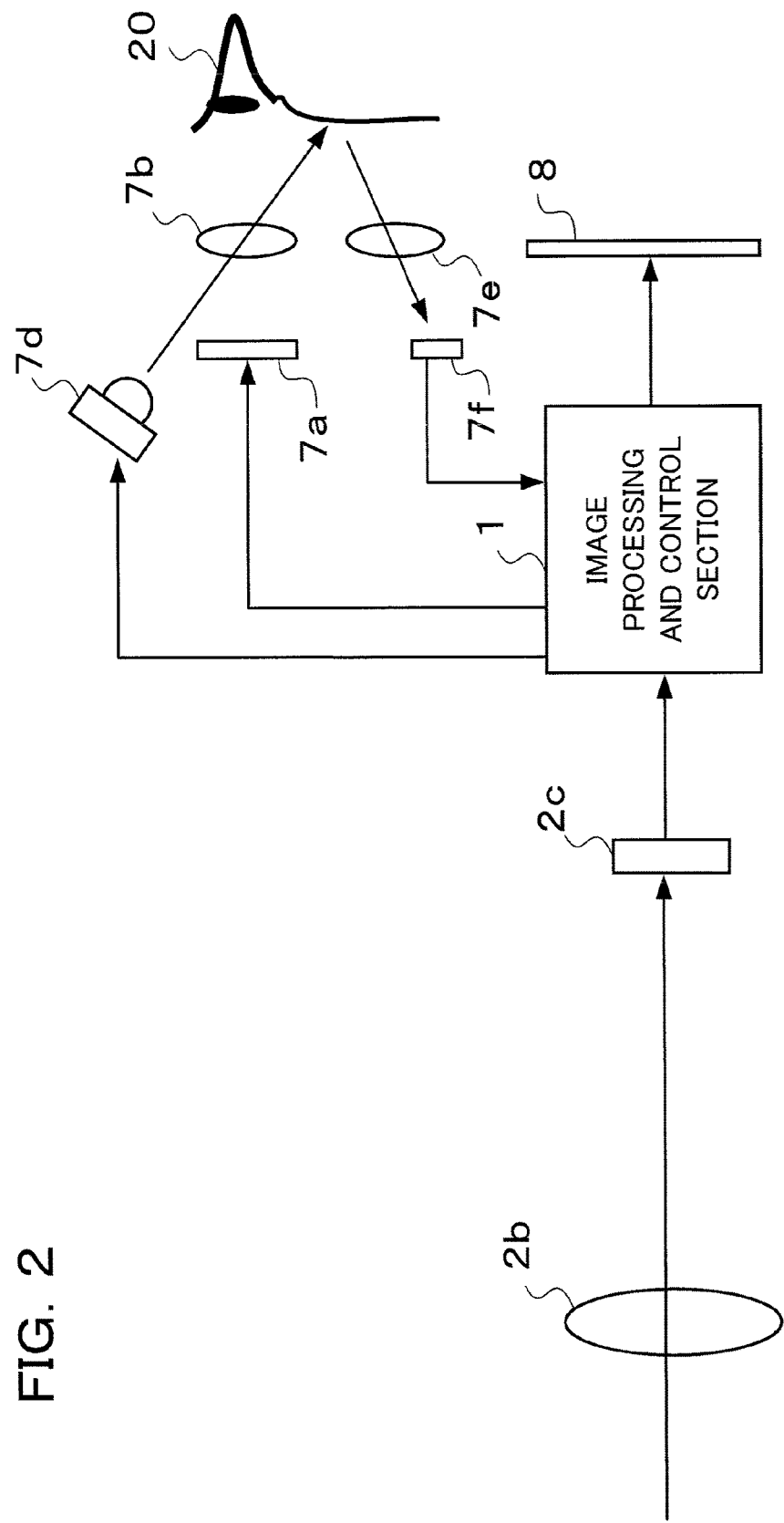
FIG. 2 is a block diagram showing a structure for carrying out eye proximity detection in the camera of the first embodiment of the present invention.

The electrical structure of the camera 10 of this embodiment is the same as the block diagrams shown in FIG. 1 and FIG. 2 relating to the first embodiment, and so detailed description is omitted. Selection of adjustment mode in this embodiment is carried out in a state where the eye of the photographer 20 is away from the eyepiece 7c, similarly to the first embodiment. FIG. 6A shows appearance of images for adjustment mode setting being displayed on the display panel of the display section 8.

Similarly to the first embodiment, on the screen for adjustment mode setting shown in FIG. 6A, as a result of the photographer 20 rotating the ring-shaped operation section 6b the adjustment mode, such as exposure compensation, is changed in accordance with the direction of rotation. When the mode has changed to the adjustment mode the photographer intends, the adjustment mode is selected if the photographer 20 touches an icon declaring "decide".

If an adjustment mode is selected, next, similarly to the first embodiment, adjustment of exposure parameters is carried out by rotating the ring-shaped operation section 6b while bringing the eye close to the eyepiece 7c and observing the in-viewfinder display section 7. As shown in FIG. 6B, an icon declaring "update" is displayed on the display panel of the display section 8 during adjustment of the shooting parameters.

In the event that the photographer wishes to carry out adjustment of shooting parameters relating to another adjustment mode during adjustment of shooting parameters, the adjustment mode is updated by touching the "update" icon. For example, with exposure compensation selected as the adjustment mode, if the photographer touches the "update" icon during adjustment of the shooting parameters for exposure compensation then aperture value is selected as the adjustment mode and shooting parameters are updated to aperture values.

Next, operation of the second embodiment of the present invention will be described using the flowchart for camera control flow shown in FIG. 7. In this flowchart, for steps that execute the same processing as in the flowchart of FIG. 5 relating to the first embodiment, the same step numbers will be affixed and detailed description will be omitted.

If the flow for camera control is entered, then similarly to the first embodiment it is detected whether or not a power supply is on (S11), whether or not it is shooting mode is determined (S13), and it is determined whether or not the photographer's eye is close to the camera (S15). If the result of this determination is that the photographer's eye is close to the camera, then similarly to the first embodiment rear surface display is next carried out, together with turning the touch panel 8b on and turning display of the in-viewfinder display section 7 off (S31).

Then, it is determined whether or not the ring-shaped operation section 6b has been rotated (S33), and if the result of this determination is that the ring-shaped operating member 6b has been rotated update of the adjustment mode is carried out (S35). Here, similarly to the first embodiment, the photographer carries out update for adjustment mode by rotating the ring-shaped operation section 6b while looking at images for adjustment mode selection displayed on the display panel of the display section 8, without looking into the eyepiece 7c (refer to FIG. 6A), Once update of adjustment mode in step S35 has been carried out, or if the result of determination in step S33 is that the ring-shaped operation section 6b has not been rotated, it is next determined whether or not the "decide" icon has been touched (S38). Here, whether or not the "decide" icon shown in FIG. 6A has been touched is determined by the touch position determination section 1c. If the result of this determination is that the "decide" icon has been touched, it is determined to be the adjustment mode that was updated in step S35.

If the result of determination in step S15 is that the photographer's eye is close to the camera, next only part of the rear surface touch panel is activated and other parts are turned off (S18). Here, within the screen of the display panel of the display section 8, a region of the touch panel 8b corresponding to only the region of the "update" icon shown in FIG. 6B is activated, and other regions of the touch panel 8b are turned off. Live view display on the display section 8 is also turned off.

Next, similarly to the first embodiment, numerical values for the selected adjustment mode are displayed in the viewfinder (S19), and live view display is carried out on the in-viewfinder display section 7 (S21). The rotation state of the ring-shaped operation section 6b is then determined (S23), and if the result of this determination is that the ring-shaped operation section 6b has been rotated, adjustment amount is switched according to the rotation (S25).

Also, in the case where the result of determination in step S23 is that the ring-shaped operation section 6b has not been rotated, it is next determined whether or not the activated region has been touched (S28). Here, it is determined whether or not the "update" icon shown in FIG. 6B has been touched.

If the result of determination in step S28 is that the "update" icon has been touched, update of the adjustment mode is next carried out (S30). Here, the currently selected adjustment mode is sequentially updated and displayed. For example, if exposure compensation is displayed as the adjustment mode, then if the "update" icon is touched the adjustment mode is updated to aperture value, and if the "update" icon is touched again it is updated to focus.

Once the processing of steps S25, S30 and S40 has been executed, or if the result of determination in step S28 is that the activated region has not been touched, or if the result of determination in step S38 is that the "decide" icon has not been touched, it is next determined whether or not there has been a release, similarly to the first embodiment (S41).

If the result of determination in step S41 is that there is no release, step S11 is returned to. On the other hand, if there has been a release, shooting and storage are carried out similarly to the first embodiment (S43). Once the shooting and storage have been carried out, processing returns to step S11.

In this way, with the second embodiment of the present invention, it is made possible to carry out adjustment mode selection by touching an icon "decide" displayed on the display surface of the display section 8 arranged on the rear surface of the camera 10 in a state where the eye is removed from the eyepiece 7c (refer to S38 and S40).

It is also possible to carry out adjustment mode update by touching an icon "update" displayed on the display surface of the display section 8 arranged on the rear surface of the camera 10 in a state where the photographer is looking through the eyepiece 7c (refer to S28 and S30). With the first embodiment, switching for adjustment of adjustment mode and shooting parameters was carried out looking into the eyepiece 7c or with the eye removed, but in the second embodiment it is possible to carry out switching simply by touching an icon on the display panel of the display section 8, and there is no danger of erroneous operation. Also, with the photographer still with their eye close to the camera it is possible to update adjustment mode with a touch operation using the right hand, and it is possible to adjust shooting parameters by rotating the ring-shaped operation section 6b with the left hand, which makes it possible to rapidly carry out update of adjustment mode and adjustment of shooting parameters.

With the second embodiment of the present invention, update of adjustment mode was carried out by touching an activated region ("update" icon) (S28), but this is not limiting and it is also possible to update by tapping. In this case, it is possible to make the determination of step S28 "tap?", as in step S27, and determine whether or not there has been a tap using the vibration detection section 5. It is also possible, for example, as shown in FIG. 6C, to enlarge the region of the "decide" icon and display a notification that update is carried out by tapping.

Figure 8:
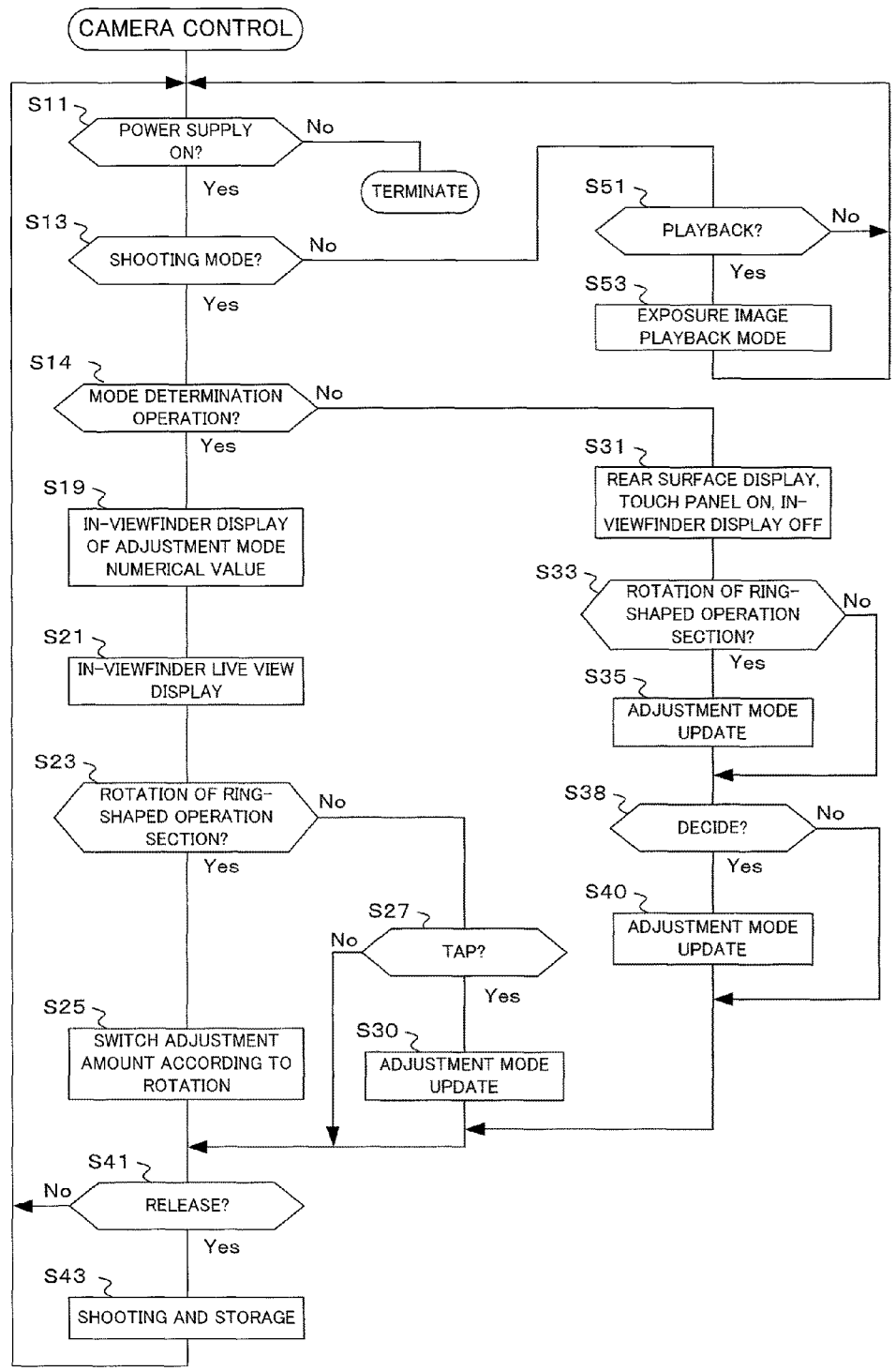
FIG. 8 is a flowchart showing operation for camera control for the camera of a third embodiment of the present invention.

Next, a third embodiment of the present invention will be described using FIG. 8 and FIG. 9. In the first and second embodiments, whether or not the photographer has their eye close to the camera was determined by an ocular detection section 7A, but in the third embodiment a separate sensor is not provided, and switching of adjustment mode and adjustment of shooting parameters is carried out by touching icons provided on the display of the rear surface display section 8.

The electrical structure of the camera 10 of the third embodiment is the same as a block diagram that has the ocular detection section 7A omitted from FIG. 1 relating to the first embodiment, and so detailed description is omitted. Members relating to the ocular detection section 7A, namely the floodlight element 7d, light receiving lens 7e and light receiving element 7f are also omitted from FIG. 2. Also, in this embodiment, before determining adjustment mode, images for adjustment mode setting that are similar to those of FIG. 6A of the second embodiment are displayed on the display panel of the display section 8.

Operation of the third embodiment of the present invention will be described using the flowchart for camera control flow shown in FIG. 8. In this flow chart, for steps that execute the same processing as in the flowchart of FIG. 5 relating to the first embodiment, or in the flowchart of FIG. 7 relating to the second embodiment, the same step numbers will be affixed and detailed description will be omitted.

If the flow for camera control is entered, then similarly to the first embodiment it is detected whether or not a power supply is on (S11), and whether or not it is shooting mode is determined (S13). If the result of this determination is that the camera is in shooting mode, then it is determined whether or not there has been a mode determination operation (S14). In the first and second embodiments, determination was performed by the ocular detection section 7A, but in this embodiment it is determined whether or not an adjustment mode has been determined in step S40. In the event that adjustment mode has never been determined in step S40, determination is carried out based on default values stored in a storage section, not shown.

If the result of determination in step S14 is that there has not been a mode determination operation, next, similarly to the first embodiment, rear surface display is carried out, together with turning the touch panel 8b on and turning display of the in-viewfinder display section 7 off (S31). At this time images for adjustment mode setting such as shown in FIG. 6A are displayed on the display panel of the display section 8.

Then, it is determined whether or not the ring-shaped operation section 6b has been rotated (S33), and if the result of this determination is that the ring-shaped operating member 6b has been rotated update of the adjustment mode is carried out (S35). Here, similarly to the first embodiment, the photographer carries out update for adjustment mode by rotating the ring-shaped operation section 6b while looking at images for adjustment mode selection displayed on the display panel of the display section 8, without looking into the eyepiece 7c (refer to FIG. 6A).

Once update of adjustment mode in step S35 has been carried out, or if the result of determination in step S33 is that the ring-shaped operation section 6b has not been rotated, it is next determined whether or not the "decide" icon has been touched (S38), similarly to the second embodiment. If the result of this determination is that the "decide" icon has been touched, it is determined to be the adjustment mode that was updated in step S35.

If the result of determination in step S14 is that there has been a mode determination operation, then next, similarly to the first embodiment, numerical values for the selected adjustment mode are displayed in the viewfinder (S19), and live view display is carried out on the in-viewfinder display section 7 (S21). The rotation state of the ring-shaped operation section 6b is then determined (S23), and if the result of this determination is that the ring-shaped operation section 6b has been rotated adjustment amount is switched according to the rotation (S25).

Also, in the case where the result of determination in step S23 is that the ring-shaped operation section 6b has not been rotated, it is next determined whether or not a tap operation has been carried out (S27). Here, it is determined whether or not the photographer 20 has carried out a tap operation based on a detection signal from the vibration detection section 5. When adjustment of numerical values of exposure parameters is being carried out with the photographer having their eye close to the camera, in the event that it is desired to adjust numerical values for shooting parameters of a different adjustment mode, with this embodiment update of adjustment mode is carried out through a tap operation.

If the result of determination in step S27 is that there has been a tap operation, updating of adjustment mode is carried out similarly to the second embodiment (S30). Here, as described previously, adjustment mode is sequentially updated in response to a tap operation. For example, if exposure compensation is displayed as the adjustment mode, then if the "update" icon is touched the adjustment mode is updated to aperture value, and if the "update" icon is touched again it is updated to focus.

Figure 9:
FIG. 9 is a drawing showing in-finder display for the camera of the third embodiment of the present invention.

As the display on the in-viewfinder display section 7, as shown in FIG. 9, it is possible to display the currently set adjustment mode (focus adjustment in the illustrated example) and an adjustment mode that will be set by the next tap operation (exposure compensation in the illustrated example). In this case, it is possible to discriminate by color, for example, so that it is possible to identify the adjustment mode that is currently set and the adjustment mode that will be set with the next operation.

Once the processing of steps S25, S30 and S40 has been executed, or if the result of determination in step S27 is that there has not been a tap operation, or if the result of determination in step S38 is that the "decide" icon has not been touched, then it is next determined whether or not there has been a release, similarly to the first embodiment (S41).

If the result of determination in step S41 is that there is no release, step S11 is returned to. On the other hand, if there has been a release, shooting and storage are carried out similarly to the first embodiment (S43). Once the shooting and storage have been carried out, processing returns to step S11.

In this way, with the third embodiment of the present invention, when an adjustment mode is not set a screen for adjustment mode setting continues to be displayed for the screen for adjustment mode setting, while if an adjustment mode has been set adjustment of numerical values of shooting parameters is carried out using the in-viewfinder display section even if the photographer's eye is close to the camera. It is therefore possible to omit the eye proximity detection section 7A and it is possible to attempt reduction in size of the camera.

In step S27, update of adjustment mode was carried out when there was a tap operation, but in addition, it is also possible to determine whether or not a touch panel is being held, and maintain an adjustment mode in the event that the touch panel is being held. Specifically, in the case the photographer's eye is close to the camera, there is a possibility of adjustment mode being erroneously updated by application of vibration such as the photographer's nose bumping on the touch panel etc. Update of adjustment mode is therefore prohibited and erroneous operation prevented when the touch panel is being held.

As has been described above, with each of the embodiments of the present invention, selection of adjustment mode is carried out in accordance with a rotation operation of the ring-shaped operation section 6b that is carried out while observing a display section 8 on the outside of the display section 8, and numerical value adjustment is carried out in accordance with rotation of the ring-shaped operation section 6b that is carried out while observing the in-viewfinder display section 7. It is therefore possible to rapidly set modes and parameters without erroneous operation and with a simple structure.

Also, with each of the embodiments of the present invention, it is possible to carry out setting of adjustment mode, and adjustment of shooting parameters according to the adjustment mode that has been set, by operating the ring-shaped operation section 6b provided on the lens barrel. It is therefore possible to rapidly carry out setting of adjustment modes and adjustment of shooting parameters without erroneous operation and with a simple structure. Specifically, it is possible to rapidly carry out setting of adjustment modes and adjustment of shooting parameters with the left hand while the camera is being held in the right hand, without erroneous operation.

In each of the embodiments of the present invention the camera 10 provided on the outside of the camera 10 has been arranged on the rear surface of the camera 10, but this is not limited to the rear surface as long as it is on the outside. Also, the in-viewfinder display section 7 is not limited to an electronic viewfinder (EVF), and it is also possible to overlay images for adjustment mode and shooting parameter setting on an optical viewfinder section.

Also, with each of the embodiments of the present invention, description has been given with examples of exposure compensation, aperture value, shutter speed and focus as numerical values for shooting parameters, but this is not limiting and it possible to adopt frame speed when in continuous shooting mode, etc. as long as it is adjustment of a shooting parameter. Further, numerical values of shooting parameters have been displayed, but display is not limited to numerical values and it is possible to have representation of shooting parameters such as with a bar display.

Also, with each of the embodiments of the present invention, a single ring-shaped operation section 6b has been arranged as the operation member provided on the lens barrel, but this is not limiting and another format is possible as long as it is easy to operate with the lens barrel in a supported posture at the time of shooting, similarly to focus adjustment. It is also possible to implement operation members separately as long as they are arranged close together, since it is possible to confirm a subject without having to significantly alter the way they are held.

Further, with each of the embodiments of the present invention, description has been given using a using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, the present invention can be applied to any device that has a photo shooting function capable of adjusting numerical values of shooting parameters.

The present invention is not limited to the above described embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A camera comprising:
an imaging section for converting a subject image to image data;
an in-viewfinder display section for displaying the subject image by means of an eyepiece, based on the image data;
a display section, provided on a rear surface of the camera, on which it is possible to view an image for adjustment mode setting without using the eyepiece;
an operation member provided on the outside of a lens barrel housing a photographing lens of the camera, configured to provide a rotation operation around the lens barrel;
a switching section for switching between a mode adjustment display on the display section and a numerical value adjustment display on the in-viewfinder display section;
a mode determination section for, when the mode adjustment display has been carried out by the switching section, determining an adjustment mode in accordance with a rotation operation of the operation member, while confirming the adjustment mode setting image displayed on the display section;
an eye proximity detection section for detecting whether or not the photographer's eye is close to the in-viewfinder display section, wherein the switching section switches the mode adjustment display and the numerical value adjustment display in accordance with an ocular detection result of the eye proximity detection section; and
a numerical value adjustment section configured to provide, when the numerical value adjustment display has been performed by the switching section, numerical value adjustment of shooting parameters in accordance with the determined adjustment mode, and in accordance with the rotation operation of the operation member, while confirming the subject image on the in-viewfinder display section,
wherein the mode determination section switches a display provided on the display section, and the numerical value adjustment section switches a display provided on the in-viewfinder display section.

2. The camera of claim 1,
wherein the display section further displays images for adjustment mode setting representing shooting parameters including focus adjustment, wherein the shooting parameters are displayed cyclically.

3. The camera of claim 1, wherein:
the mode determination section cyclically updates the shooting parameters in accordance with the rotation operation.

4. The camera of claim 3, wherein:
the shooting parameters are updated in the same direction as the direction of operation of the rotation operation of the operation member.

5. The camera of claim 1,
wherein the display section further displays numerical values of the exposure values, and wherein
the numerical value adjustment section displays numerical values of the shooting parameters on the display section when the rotation operation has been executed.

6. The camera of claim 1, wherein:
the numerical value adjustment section increases or decreases numerical values in accordance with the rotation operation, at the time of the numerical value adjustment display to the in-viewfinder display section.

7. The camera of claim 1,
wherein the display section further displays images for determination of the adjustment mode, the camera further comprising:
a touch panel for detecting touching of a display panel of the display section, wherein
the mode determination section sequentially switches the adjustment mode in accordance with touching of the touch panel.

8. The camera of claim 1, further comprising:
a display panel for carrying out display images for the adjustment mode determination; and
a touch panel for detecting touching of a display panel, wherein
when touching of the display panel is detected during display of display images for the adjustment mode determination, the adjustment mode is determined based on the touched position.

9. The camera of claim 1, further comprising:
a vibration detection section for detecting a tap operation applied to the camera, wherein
when the tap operation is detected by the vibration detection section, the adjustment mode is updated or a reset of the setting values is carried out.

10. The camera of claim 1, further comprising:
a touch panel is provided on the display section, wherein the switching section switches the mode adjustment display and the numerical value adjustment display in accordance with setting on the touch panel.

11. A camera comprising:
an imaging section for converting a subject image to image data;
a display section provided on the outside of the camera configured to display adjustment modes;
an in-viewfinder display section arranged inside a body and configured to display shooting parameters, and the subject image based on the image data;
an operation section arranged configured to provide rotation on the outer periphery of a lens barrel;
a switching section for switching between display of the adjustment mode on the display section and display of the exposure parameters on the in-viewfinder display section;
a control section carrying out selection of adjustment mode in accordance with a rotation operation of the operation section when the adjustment modes are displayed on the display section, and carrying out adjustment of exposure parameters in accordance with a rotation operation of the operation member while confirming the subject image when the exposure parameters are displayed on the in-viewfinder display section; and
an eye proximity detection section for detecting whether or not a photographer's eye is close to the in-viewfinder display section,
wherein the switching section switches display of the adjustment mode on the display section and display of shooting parameters on the in-viewfinder display section in accordance with an eye proximity detection result of the eye proximity detection section.

12. The camera of claim 11, further comprising:
a detection section for detecting whether or not the in-viewfinder display section is being observed, wherein
in the event that it has been detected by the detection section that the in-viewfinder display section is being observed, the control section carries out adjustment of shooting parameters in accordance with rotation operation of the operation section when the shooting parameters are displayed on the in-viewfinder display section.

13. The camera of claim 11, further comprising:
a vibration detection section for detecting a tap operation applied to the camera, wherein
when the tap operation is detected by the vibration detection section, the control section updates the adjustment mode or resets the setting values.

14. The camera of claim 11, further comprising:
a touch panel for detecting a touch operation of the display section, wherein
when the touch operation is detected by the touch panel, the control section updates adjustment mode, determines adjustment mode, or maintains adjustment mode.

* * * * *